3,119,816
2'-SUBSTITUTED THIAZOLO[5',4'-16,17]STEROID OF ANDROSTANE SERIES
Taichiro Komeno, Sumiyoshi-ku, Osaka-shi, Japan, assignor to Shionogi & Co., Ltd., Osaka, Japan
No Drawing. Filed Dec. 17, 1962, Ser. No. 244,877
Claims priority, application Japan Dec. 19, 1961
13 Claims. (Cl. 260—239.5)

This invention relates to thiazolosteroids and production thereof. More particularly, it relates to thiazolo-[5',4'-16,17]androstanes and production thereof.

The said thiazolo[5',4'-16,17]androstanes are intended to mean the steroids having the partial structural formula:

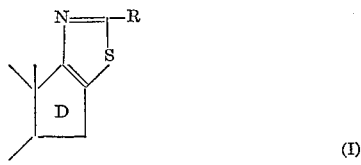

wherein R is a hydrogen atom, a lower alkyl group (e.g. methyl, ethyl, propyl), an amino group, a lower alkanoylamino group (e.g. acetylamino, propionylamino) or a lower alkoxy group (e.g. methoxy, ethoxy, propoxy).

It is an object of the present invention to embody the said thiazolo[5',4'-16,17]androstanes. Another object of this invention is to embody a generally applicable process for constructing a condensed thiazole nucleus between the 16- and 17-positions of steroid. A further object of this invention is to embody thiazolo[5',4'-16,17]androstanes having pharmacological activities. These and other objects will be apparent to those conversant with the art to which the present invention pertains from the subsequent description.

The process of the present invention is representable by the following partial formula scheme showing only the D-ring of the steroid skeleton:

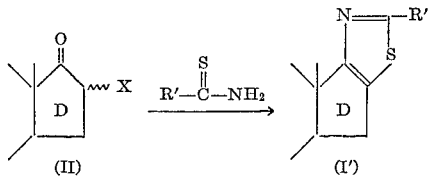

wherein X is a halogen atom (e.g. chlorine, bromine, iodine), R' is a hydrogen atom, a lower alkyl group (e.g. methyl, ethyl, propyl), an amino group or a lower alkoxy group (e.g. methoxy, ethoxy, propoxy) and the ripple mark ($) represents α- or β-configuration.

The process of the present invention is generally applicable to 16-halogeno-17-oxo-steroids of the androstane series having the partial structure of Formula II. Thus, the starting material of the present invention may be 16-chloro-17-oxo-steroids, 16-bromo-17-oxo-steroids or 16-iodo-17-oxo-steroids of androstane series. The steric configuration of the halogen atom on the D-ring of the starting material has substantially no effect on the reaction; that is, the halogen atom may have α- or β-configuration. Furthermore, such a substituent which does not exert any substantial effect on the reaction, as 3-hydroxyl and 11-oxo group, may exist at any position on the A-, B- or C-ring of the starting material. Examples of 16-halogeno-17-oxo-steroids available as the starting compound include 3α-hydroxy-16α-chloro-17-oxo-5β-androstane, 3α-hydroxy-16α-bromo-17-oxo-5β-androstane, 3β-hydroxy-16α-bromo-17-oxo-5α-androstane, 3α-hydroxy-16β-bromo-17-oxo-5α-androstane, 3β-hydroxy-16β-bromo-17-oxo-5β-androstane, 3β-hydroxy-16β-bromo-17-oxo-5α-androstane, 3β-hydroxy-16α-iodo-17-oxo-5α-androstane, 3β-hydroxy-16α-chloro-17-oxo-5(6)-androstene, 3α-hydroxy-16α-bromo-17-oxo-5(6)-androstene, 3β-hydroxy-16α-bromo-17-oxo-5(6)-androstene, 3α-hydroxy-16β-bromo-17-oxo-5(6)-androstene, 3β-hydroxy-16β-bromo-17-oxo-5(6)-androstene, 3α-hydroxy-16β-iodo-17-oxo-5(6)-androstene, 3,17-dioxo-16α-chloro-5β-androstane, 3,17-dioxo-16α-bromo-5α-androstane, 3,17-dioxo-16α-bromo-5β-androstane, 3,17-dioxo-16β-bromo-5α-androstane, 3,17-dioxo-16β-bromo-5β-androstane, 3,17-dioxo-16α-chloro-4-androstene, 3,17-dioxo-16α-bromo-4-androstene, 3,17-dioxo-16β-bromo-4-androstene, 3α-acetoxy-16α-chloro-17-oxo-5β-androstane, 3α-acetoxy-16α-bromo-17-oxo-5β-androstane, 3α-propoxy-16α-bromo-17-oxo-5β-androstane, 3β-acetoxy-16α-bromo-17-oxo-5α-androstane, 3β-butoxy-16α-bromo-17-oxo-5α-androstane, 3α-acetoxy-16β-bromo-17-oxo-5β-androstane, 3β-acetoxy-16β-bromo-17-oxo-5α-androstane, 3β-acetoxy-16α-iodo-17-oxo-5α-androstane, 3β-acetoxy-16α-chloro-17-oxo-5(6)-androstene, 3α-acetoxy-16α-bromo-17-oxo-5(6)-androstene, 3α-propoxy-16α-bromo-17-oxo-5(6)-androstene, 3β-acetoxy-16α-bromo-17-oxo-5(6)-androstene, 3β-propoxy-16α-bromo-17-oxo-5(6)-androstene, 3β-butoxy-16α-bromo-17-oxo-5(6)-androstene, 3α-acetoxy-16β-bromo-17-oxo-5(6)-androstene, 3β-acetoxy-16β-bromo-17-oxo-5(6)-androstene, 3α-acetoxy-16β-iodo-17-oxo-5(6)-androstene, 3,3-ethylenedioxy-16α-chloro-17-oxo-5β-androstane, 3,3-ethylenedioxy-16α-bromo-17-oxo-5α-androstane, 3,3-ethylenedioxy-16α-bromo-17-oxo-5β-androstane, 3,3-ethylenedioxy-16β-bromo-17-oxo-5α-androstane, 3,3-ethylenedioxy-16β-bromo-17-oxo-5β-androstane, 3,3-ethylenedioxy-16α-chloro-17-oxo-5(6)-androstene, 3,3-ethylenedioxy-16α-bromo-17-oxo-5(6)-androstene, 3,3-ethylenedioxy-16β-bromo-17-oxo-5(6)-androstene, 3,11,17-trioxo-16α-bromo-4-androstene, 3,11,17-trioxo-16β-bromo-4-androstene, 3,17-dioxo-11β-hydroxy-16β-bromo-4-androstene, etc. These 16-halogeno-17-oxo-steroids of the androstane series are known and/or can be prepared according to conventional methods [e.g. J. Fried et al.: U.S. Patent Nos. 2,857,403 and 2,831,872; B. Ellis et al.: J. Chem. Soc., 800 (1958); J. Fajkoš et al.: Chemical Abstracts, 53, 4349 ('1959)].

The reagents to be condensed with the said 16-halogeno-17-oxo-steroids are the thiocarbamoyl compounds representable by the formula:

wherein R' has the same significance as designated above, which include thioformamide, thio(lower)alkanoylamide (e.g. thioacetamide, thiopropionamide), thiourea, lower alkyl thiocarbamate (e.g. methyl thiocarbamate, ethyl thiocarbamate), etc.

The process of the present invention comprises condensing the 16-halogeno-17-oxo-steroid of the androstane series having the partial structure of Formula II with the thiocarbamoyl compound of Formula III in an inert organic solvent (e.g. methanol, ethanol, propanol). The reaction temperature may be selected on the basis of the starting materials and reagents. A relatively high temperature such as reflux or more than 100° C. is usually needed. Depending on the kind of the employed thiocarbamoyl compound the condensation reaction may proceed incompletely. For instance, when thiourea is employed as a reagent, there is obtained not the objective thiazolo[5',4'-16,17]androstane having the partial structure of Formula I' but the intermediate thereto as the result of said condensation reaction. In such case, with or without the previous separation of the intermediarily produced compound from the reaction mixture, the intermediate may be treated with an alkali (e.g. potassium hydroxide, sodium hydroxide) to obtain the objective thiazolo[5',4'-16,17]androstane having the partial structure of Formula I'. These thiazolo[5',4'-16,17] androstanes may be secondarily subjected to a per se conventional reaction for converting the substituent on the thiazole nucleus into another substituent.

The thus-produced thiazolo[5',4'-16,17]androstanes having the partial structure of Formula I include, for example, 2'-methylthiazolo[5',4'-16,17]androsta-5,16-dien-3β-ol,
2'-ethylthiazolo[5',4'-16,17]androsta-5,16-dien-3β-ol,
2'-propylthiazolo[5',4'-16,17]androsta-5,16-dien-3β-ol,
2'-methylthiazolo[5',4'-16,17]androsta-5,16-dien-3α-ol,
2'-ethylthiazolo[5',4'-16,17]androsta-5,16-dien-3α-ol,
2'-methylthiazolo[5',4'-16,17]androsta-5,16-dien-3β-ol 3-acetate,
2'-ethylthiazolo[5',4'-16,17]androsta-5,16-dien-3β-ol 3-propionate,
2'-methylthiazolo[5',4'-16,17]androsta-4,16-dien-3-one,
2'-ethylthiazolo[5',4'-16,17]androsta-4,16-dien-3-one,
2'-ethylthiazolo[5',4'-16,17]androst-16-en-3-one,
2'-methylthiazolo[5',4'-16,17]androst-16-en-3-one 3,3-ethyleneketal,
thiazolo[5,4'-16,17]androsta-5,16-dien-3α-ol,
thiazolo[5',4'-16,17]androsta-4,16-dien-3-one,
2'-aminothiazolo[5',4'-16,17]androst-16-en-3-one,
2'-aminothiazolo[5',4'-16,17]androsta-5,16-dien-3β-ol,
2'-aminothiazolo[5',4'-16,17]androsta-5,16-dien-3α-ol,
2'-acetylaminothiazolo[5',4'-16,17]androsta-5,16-dien-3β-ol 3-acetate,
2'-propionylaminothiazolo[5',4'-16,17]androsta-5,16-dien-3α-ol 3-propionate,
2'-acetylaminothiazolo[5',4'-16,17]androsta-4,16-dien-3-one,
2'-propionylaminothiazolo[5',4'-16,17]androsta-4,16-dien-3-one,
2'-methoxythiazolo[5',4'-16,17]androsta-4,16-dien-3-one,
2'-ethoxythiazolo[5',4'-16,17]androsta-4,16-dien-3-one,
2'-methoxythiazolo[5',4'-16,17]androsta-5,16-dien-3β-ol,
2'-methoxythiazolo[5',4'-16,17]androsta-5,16-dien-3β-ol 3-acetate,
2'-methoxythiazolo[5',4'-16,17]androsta-4,16-dien-3,11-dione, etc.

These thiazolo[5',4'-16,17]androstanes having the partial structure of Formula I are generally useful as antagonists to hormonic substances. For example, a representative compound prepared by the process of the present invention, 2'-methylthiazolo[5',4'-16,17]androsta-4,16-dien-3-one produces inhibition of gonadotropin secretion without showing any androgenic response in the castrated male rat which received a total of 10 milligrams. Accordingly, the compound is useful as (1) controlling agent for diseases of menopause; (2) ovulation-inhibition agent or contraceptive agent; and (3) controlling agent for hypergonadism or precocious puberty. Animal test data, e.g. with the rat, establish that the other compounds of the present invention also show specific activities. For instance, 2-aminothiazole[5',4'-16,17]androsta-5,16-dien-3-ol possesses a Na-excreting action and 2'-acetylaminothiazolo[5',4'-16,17]androsta-4,16-dien-3-one shows a Na-retaining activity.

The following examples set forth illustratively presently-preferred embodiments of the invention. In these examples, mg.=milligram(s), g.=gram(s), and ml.=millilitre(s). Other abbreviations each have a conventional meaning.

EXAMPLE 1

*Preparation of 2'-Methylthiazolo[5',4',-16,17]Androsta-5,16-Dien-3β-Ol 3-Acetate*

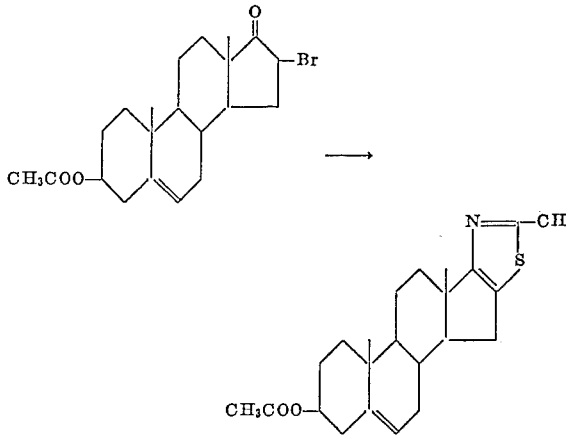

A solution of 3β-acetoxy-16β-bromo-5-androsten-17-one [B. Ellis et al.: J. Chem. Soc., 800 (1958)] (730 mg.) and thioacetamide (800 mg.) in anhydrous ethanol (20 ml.) is put in a sealed steel-tube and heated for 35 hours in an oil bath at 175° C. The reaction mixture is diluted with water and shaken with ether. The ether extract is washed with an aqueous solution of sodium carbonate and water in turn, dried over anhydrous sodium sulfate and evaporated to dryness. The residue (759 mg.) is chromatographed on alumina (20 g.). The eluates with a mixture of petroleum ether and benzene (4:1 to 1:1) are combined together, evaporated and crystallized from methanol to give 2'-methylthiazolo[5', 4'-16,17]androsta-5,16-dien-3β-ol 3-acetate (304 mg.) as plates melting at 190 to 192° C. $[α_D^{30}]$ —39.5 ±2° (in chloroform).

U.V.: $\lambda_{max.}^{95\%\ ethanol}$ 260 mµ (ε: 5,400). I.R.: $\nu_{max.}^{Nujol}$ cm.$^{-1}$ 1736 1512; 1242; 1028

*Analysis.*—Calcd. for $C_{23}H_{31}O_2NS$: C, 71.65; H, 8.10; N, 3.63; S, 2.32. Found: C, 71.86; H, 8.04; N, 3.69; S, 8.42.

In similar manner, there are obtained other 2'-lower alkylthiazolo[5',4'-16,17]androsta-5,16-dien-3β-ol 3-lower alkanoates such as 2'-methylthiazolo[5',4',16,17]androsta-5,16-dien-3β-ol 3-propionate, 2'-methylthiazolo[5',4'-16,17]androsta-5,16-dien-3β-ol 3-butyrate and 2'-ethylthiazolo[5',4'-16,17]androsta-5,16-dien-3β-ol 3-acetate.

EXAMPLE 2

*Preparation of 2-Methylthiazolo[5',4'-16,17]Androsta-5,16-Dien-3β-Ol*

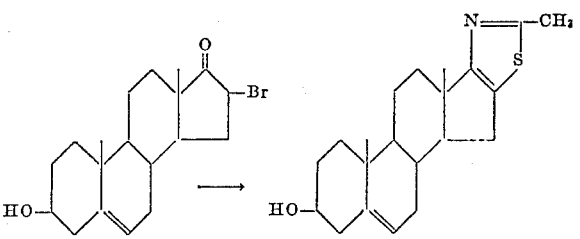

3β-hydroxy - 16β - bromo-5-androsten-17-one [B. Ellis et al.: J. Chem. Soc., 800 (1958)] is reacted with thioacetamide in anhydrous ethanol and treated as in Example 1 to obtain 2'-methylthiazolo[5',4'-16,17]androsta-5,16-dien-3β-ol as crystals melting at 200 to 202° C. (decomp.). [α]$_D^{30}$ —55.9 ±4° (in chloroform).

U.V.: $\lambda_{max.}^{95\% \text{ ethanol}}$ 260 mμ (ε: 5,480). I.R.: $\nu_{max.}^{Nujol}$ cm.$^{-1}$ 3334; 1515

Analysis.—Calcd. for $C_{21}H_{29}ONS$: C, 73.42; H, 8.51; N, 4.08; S, 9.33. Found: C, 73.72; H, 8.89; N, 3.99; S, 9.41.

The 2'-methylthiazolo[5',4'-16,17]androsta - 5,16-dien-3β-ol is also prepared by hydrolyzing 2'-methylthiazolo-[5',4'-16,17]androsta - 5,16 - dien-3β-ol 3-acetate obtained in Example 1 with an alkaline substance. Thus, a solution of 2'-methylthiazolo[5',4'-16,17]androsta-5,16-dien-3β-ol 3-acetate (240 mg.) and potassium carbonate (300 mg.) in a mixture of methanol (10 ml.) and water (3 ml.) is refluxed for 30 minutes. The reaction mixture is diluted with water and the precipitated crystals are collected by filtration, dried and recrystallized from methanol to give 2'-methylthiazolo[5',4'-16,17]androsta-5,16-dien-3β-ol (210 mg.).

In the similar manner, there are obtained other 2'-lower alkylthiozolo[5',4'-16,17]androsta - 5,16 - dien - 3β - ols such as 2' - methylthiazolo[5',4'-16,17]androsta - 5,16-dien-3β-ol and 2'-ethylthiazolo[5',4'-16,17]androsta-5,16-dien-3β-ol.

EXAMPLE 3

*Preparation of 2'-Methylthiazolo[5',4'-16,17]Androsta-4,16-Dien-3-One*

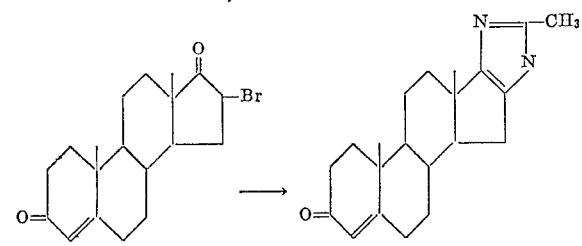

16β-bromo - 4 - androstene-3,17-dione [J. Fajkoš et al.: Chemical Abstracts, 53, 4349 (1959)] is reacted with thioacetamide in anhydrous ethanol and treated as in Example 1 to obtain 2'-methylthiazolo[5',4'-16,17]androsta - 4,16 - diene-3-one as plates melting at 203 to 205° C. (decomp.). [α]$_D^{30}$ +90.6 ±2° (in chloroform).

U.V.: $\lambda_{max.}^{95\% \text{ ethanol}}$ 243 mμ (ε: 20,110). I.R.: $\nu_{max.}^{Nujol}$ cm.$^{-1}$ 1679; 1622; 1514

Analysis.—Calcd. for $C_{21}H_{27}ONS$: C, 73.85; H, 7.97; N, 4.10; S, 9.39. Found: C, 73.94; H, 8.23; N, 3.98; S, 9.20.

The 2' - methylthiazolo[5',4'-16,17]androsta-4,16-dien-3-one is also prepared by subjecting 2'-methylthiazolo-[5',4'-16,17]androsta - 5,16 - dien - 3β - ol obtained in Example 2 to Oppenauer oxidation. Thus, a solution of 2'-methylthiazolo[5',4'-16,17]androsta - 5,16 - dien-3β-ol (155 mg.) in a mixture of toluene (10 ml.) and cyclohexanone (1 ml.) is distilled to about ¾ volume for removal of water in the solution. While the distillation is continued, a solution of aluminum isopropoxide (100 mg.) in toluene (5 ml.) is added to the distilling solution. Then, the distillation is further continued mildly for 1 hour. To the reaction mixture, there is added an aqueous solution of potassium sodium tartrate, and the resultant mixture is shaken with ether. The ether extract is washed with water, dried and evaporated to dryness. The residue is crystallized from acetone to give 2'-methylthiazolo[5', 4'-16,17]androsta - 4,16 - dien - 3 - one (105 mg.).

In similar manner, there are obtained other 2'-lower alkylthiazolo[5',4'-16,17]androsta - 4,16-dien-3-ones such as 2'-ethylthiazolo[5',4'-16,17]androsta - 4 - 16 - dien-3-one and 2'-propylthiazolo[5',4'-16,17]androsta - 4,16-dien-3-one.

EXAMPLE 4

*Preparation of 2'-Aminothiazolo[5',4'-16,17]Androsta-5,16-Dien-3β-Ol*

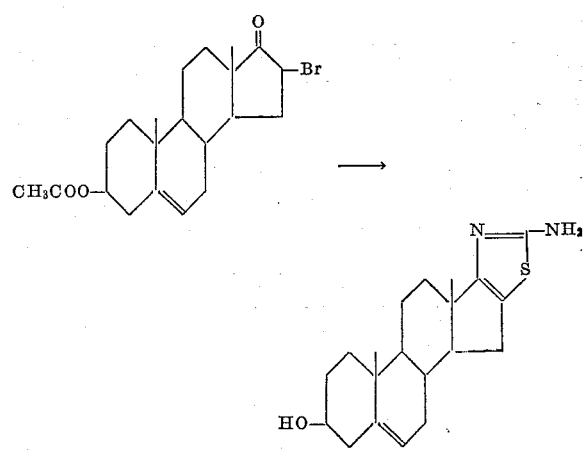

A solution of 3β-acetoxy-16β-bromo - 5 - androsten-17-one (6.00 g.) and thiourea (2.25 g.) in anhydrous ethanol (30 ml.) is refluxed for 27 hours. To the reaction mixture, there is added water, and the precipitate is collected by filtration, washed with water and dried. The collected substance is heated on a steam bath with potassium hydroxide (7 g.) in methanol (70 ml.) for 30 minutes. To the resulting mixture, there is added water, and the precipitated crystals are collected by filtration, washed with water, dried and recrystallized from a mixture of chloroform and ethanol to give 2'-aminothiazolo[5',4'-16,17]androsta-5,16-dien-3β-ol (4.27 g.) as fine needles melting at 268 to 270° C. (decomp.). [α]$_D^{29}$ —35.3 ±2° (in pyridine).

U.V.: $\lambda_{max.}^{95\% \text{ ethanol}}$ 270 mμ (ε: 6,430). I.R.: $\nu_{max.}^{Nujol}$ cm.$^{-1}$ 3394; 3302; 3234; 3124; 1629; 1513; 1054. $\nu_{max.}^{chloroform}$ cm.$^{-1}$ 3660; 3618; 3442; 1604; 1503

Analysis.—Calcd. for $C_{20}H_{28}ON_2S$: C, 69.72; H, 8.19; N, 8.13; S, 9.31. Found: C, 69.63; H, 8.33; N, 8.38; S, 9.35

EXAMPLE 5

*Preparation of 2'-Acetylaminothiazolo[5',4'-16,17] Androsta-5,16-Dien-3β-Ol 3-Acetate*

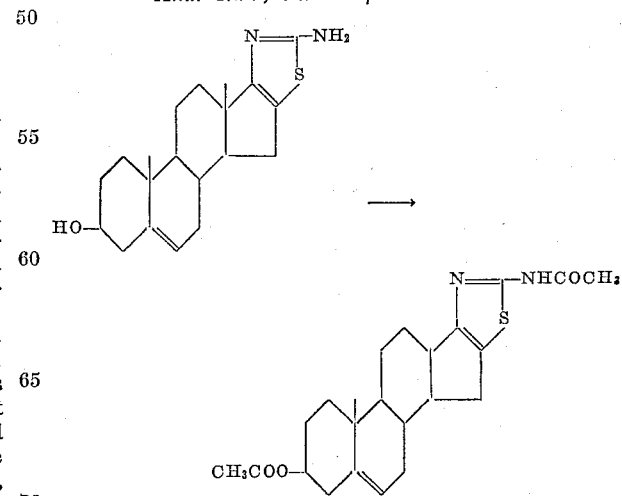

2'-aminothiazolo[5',4'-16,17]androsta - 5,16 - dien-3β-ol is acetylated with acetic anhydride in a conventional manner and the resulting product is crystallized from a mixture of chloroform and methanol to give 2'-acetylaminothiazolo[5',4'-16,17]androsta - 5,16 - dien-3β-ol 3- acetate as crystals melting at 291 to 293° C (decomp.). $[\alpha]_D^{27}$ −41.4 ±2° (in pyridine).

U.V.: $\lambda_{max.}^{95\% \text{ ethanol}}$ 287 mµ (ε: 11,290). I.R.: $\nu_{max.}^{\text{Nujol}}$ cm.⁻¹ 3270; 3246; 3080; 1729; 1689; 1550; 1270; 1034. $\nu_{max.}^{\text{chloroform}}$ cm.⁻¹ 3472; 3286; 1729; 1694; 1530; 1250; 1030

*Analysis.*—Calcd. for $C_{24}H_{32}O_3N_2S$: C, 67.27; H, 7.53; N, 6.54; S, 7.48. Found: C, 66.94; H, 7.44; N, 6.52; S, 7.55.

In similar manner, there are obtained other 2′-lower alkanoylaminothiazolo[5′,4′-16,17]androsta - 5,16 - dien-3β-ol 3-lower alkanoates such as 2′-propionylaminothiazola[5′,4′-16,17]androsta - 5,16 - dien - 3β - ol 3-propionate and 2′-butyrylaminothiazolo[5′,4′-16,17]androsta-5,16-dien-3β-ol 3-butyrate.

EXAMPLE 6

*Preparation of 2′-Aminothiazolo[5′,4′-16,17] Androsta-4,16-Dien-3-One*

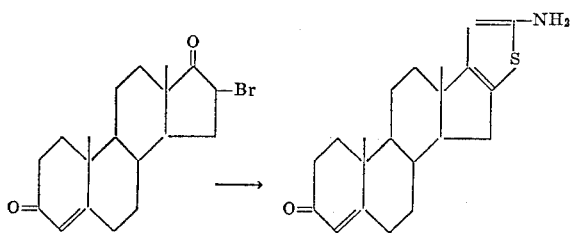

16β-bromo-4-androstene-3,17-dione [J. Fajkoš et al.: Chemical Abstracts, 53, 4349 (1959)] is reacted with thiourea in anhydrous ethanol and treated as in Example 4 to obtain 2′-aminothiazolo[5′,4′-16,17]androsta-4,16-dien-3-one as yellow needles melting at 271 to 273° C. (decomp.). $[\alpha]_D^{24}$ +119.3 ±2° (in pyridine).

U.V.: $\lambda_{max.}^{95\% \text{ ethanol}}$ 242 mµ (ε: 19,360). I.R.: $\nu_{max.}^{\text{Nujol}}$ cm.⁻¹ 3452; 3290; 3202; 3178; 1676; 1622; 1540; 1517; 864. $\nu_{max.}^{\text{chloroform}}$ cm.⁻¹ 3662; 3548; 3426; 1663; 1605; 1506; 863

*Analysis.*—Calcd. for $C_{20}H_{26}ON_2S$: C, 70.13; H, 7.65; N, 8.18; S, 9.46. Found: C, 69.69; H, 7.84; N, 8.27; S, 9.32.

The 2′-aminothiazolo[5′,4′-16,17]androsta-4,16-dien-3-one is also prepared by subjecting 2′-aminothiazolo[5′,4′-16,17]androsta-5,16-dien-3β-ol obtained in Example 4 to Oppenauer oxidation. Thus, a solution of 2′-aminothiazolo[5′,4′-16,17]androsta-5,16-dien-3β-ol (2.74 g.) and aluminum isopropoxide (2.00 g.) in a mixture of dioxane (50 ml.), toluene (50 ml.) and cyclohexanone (15 ml.) is refluxed for 4 hours. After cooling, the reaction mixture is mixed with a saturated aqueous solution of potassium sodium tartrate and steam distilled for 1 hour. The precipitate is collected by filtration, washed with water, dried and crystallized from a mixture of chloroform and ethanol to give 2′-aminothiazolo[5′,4′-16,17]androsta-4,16-dien-3-one (2.38 g.).

EXAMPLE 7

*Preparation of 2′-Acetylaminothiazolo[5′,4′-16,17] Androsta-4,16-Dien-3-One*

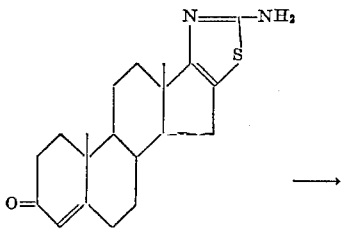

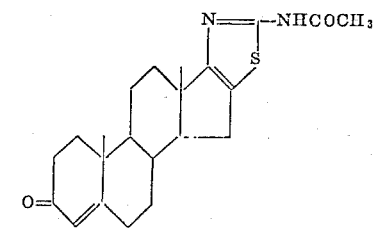

2′ - aminothiazolo[5′,4′ - 16,17]androsta - 4,16 - dien-3-one is acetylated with acetic anhydride in pyridine in a conventional manner and the resulting product is crystallized from methanol to give 2′-acetylaminothiazolo[5′,4′-16,17]androsta-4,16-dien-3-one as colorless needles melting at 282 to 284° C. (decomp.). $[\alpha]_D^{23.5}$ +113.2 ±2° (in pyridine).

U.V.: $\lambda_{max.}^{95\% \text{ ethanol}}$ 241 mµ (ε: 18,800); 287 mµ (ε: 11,430). I.R.: $\nu_{max.}^{\text{Nujol}}$ cm.⁻¹ 3230; 3068; 1694; 1665; 1616; 1552

*Analysis.*—Calcd. for $C_{22}H_{28}O_2N_2S$: C, 68.72; H, 7.34; N, 7.29; S, 8.24. Found: C, 68.71; H, 7.46; N, 7.38; S, 8.55.

In similar manner, there are obtained other 2′-lower alkanoylaminothiazolo[5′,4′ - 16,17]androsta - 4,16-dien-3-ones such as 2′-propionylaminothiazolo[5′,4′-16,17]androsta-4,16-dien-3-one and 2′-butyrylaminothiazolo[5′,4′-16,17]androsta-4,16-dien-3-one.

What is claimed is:

1. A thiazolosteroid of the formula

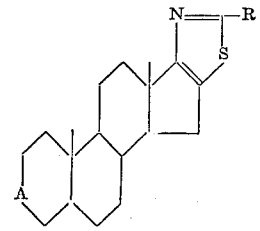

wherein R is a member selected from the group consisting of H, lower alkyl, amino, lower alkanoylamino and lower alkoxy, A is a member selected from the group consisting of hydroxymethylene, lower alkanoyloxymethylene and carbonyl, and a double bond is present between the 5-position and the adjacent position thereto.

2. 2′ - lower alkylthiazolo[5′,4′ - 16,17]androsta-5,16-dien-3β-ol 3-lower alkanoate.

3. 2′ - methylthiazolo[5′,4′ - 16,17]androsta - 5,16-dien-3β-ol 3-acetate.

4. 2′ - lower alkylthiazolo[5′,4′ - 16,17]androsta-5,16-dien-3β-ol.

5. 2′ - methylthiazolo[5′,4′ - 16,17]androsta - 5,16-dien-3β-ol.

6. 2′ - lower alkylthiazolo[5′,4′ - 16,17]androsta - 4,16-dien-3-one.

7. 2′ - methylthiazolo[5′,4′ - 16,17]androsta - 4,16-dien-3-one.

8. 2′ - aminothiazolo[5′,4′ - 16,17]androsta - 5,16-dien-3β-ol.

9. 2′ - lower alkanoylaminothiazolo[5′,4′ - 16,17]androsta-5,16-dien-3β-ol 3-lower alkanoate.

10. 2′ - acetylaminothiazolo[5′,4′ - 16,17]androsta-5,16-dien-3β-ol 3-acetate.

11. 2′ - aminothiazolo[5′,4′ - 16,17]androsta - 4,16-dien-3-one.

12. 2′ - lower alkanoylaminothiazolo[5′,4′ - 16,17]androsta-4,16-dien-3-one.

13. 2′ - acetylaminothiazolo[5′,4′ - 16,17]androsta - 4,16-dien-3-one.

No references cited.